(12) United States Patent
Fukushima et al.

(10) Patent No.: US 7,727,645 B2
(45) Date of Patent: Jun. 1, 2010

(54) SUBSTRATE FOR MAGNETIC RECORDING MEDIUM, MAGNETIC RECORDING MEDIUM, AND MAGNETIC RECORDING AND REPRODUCING APPARATUS

(75) Inventors: Masato Fukushima, Chiba (JP); Katsuaki Aida, Chiba (JP); Kenji Shimizu, Chiba (JP)

(73) Assignee: Showa Denko K.K., Tokyo (JP)

( * ) Notice: Subject to any disclaimer, the term of this patent is extended or adjusted under 35 U.S.C. 154(b) by 175 days.

(21) Appl. No.: 11/916,988

(22) PCT Filed: Jun. 30, 2006

(86) PCT No.: PCT/JP2006/313514

§ 371 (c)(1),
(2), (4) Date: Dec. 7, 2007

(87) PCT Pub. No.: WO2007/007650

PCT Pub. Date: Jan. 18, 2007

(65) Prior Publication Data

US 2009/0226767 A1    Sep. 10, 2009

Related U.S. Application Data

(60) Provisional application No. 60/700,338, filed on Jul. 19, 2005.

(30) Foreign Application Priority Data

Jul. 8, 2005    (JP) .............................. 2005-200628

(51) Int. Cl.
*B32B 3/10* (2006.01)
*G11B 5/33* (2006.01)
*C03B 23/02* (2006.01)

(52) U.S. Cl. .............. 428/846.9; 428/847.7; 428/848.6; 360/135; 65/60.2

(58) Field of Classification Search ................ 428/848, 428/848.1, 849, 842, 833, 843.7, 457, 410, 428/835.8, 836.2, 847.7, 848.3, 846.9; 360/16, 360/17, 135, 136; 369/278; 65/60.2, 60.4, 65/174, 112, 61; 451/44
See application file for complete search history.

(56) References Cited

U.S. PATENT DOCUMENTS 6,096,405 A    8/2000    Takahashi et al.
(Continued)

FOREIGN PATENT DOCUMENTS

CN    1178361 A    4/1998
(Continued)

*Primary Examiner*—Kevin M. Bernatz
*Assistant Examiner*—Louis Falasco
(74) *Attorney, Agent, or Firm*—Sughrue Mion, PLLC

(57) ABSTRACT

The invention provides a magnetic recording medium substrate product which enables enhancement of contact strength between a substrate end surface and a soft magnetic layer, as well as suppression of occurrence of corrosion, a magnetic recording medium including the substrate product, which exhibits no deterioration of electromagnetic conversion characteristics and has excellent durability and a magnetic recording and reproducing apparatus including the magnetic recording medium. The magnetic recording medium substrate product includes a disk-shaped non-magnetic substrate having a circular hole in a center portion thereof, and having a chamfer formed at least one of a portion between a main surface on which a magnetic layer is to be formed and an outer end surface and a portion between the main surface and an inner end surface defining the circular hole, wherein the chamfer has a surface roughness (Ra) falling within a range of $4.0\ \text{Å} \leq Ra \leq 100\ \text{Å}$, preferably $4.0\ \text{Å} \leq Ra \leq 50\ \text{Å}$, as measured by means of an AFM.

17 Claims, 4 Drawing Sheets

U.S. PATENT DOCUMENTS

| | | | |
|---|---|---|---|
| 2002/0055017 A1* | 5/2002 | Fukushima et al. | 428/848.1 |
| 2003/0054736 A1* | 3/2003 | Hagan et al. | 451/44 |
| 2003/0082407 A1* | 5/2003 | Sakawaki et al. | 428/842 |
| 2003/0104253 A1* | 6/2003 | Osawa et al. | 428/849 |
| 2004/0038082 A1* | 2/2004 | Tsumori | 428/848 |
| 2004/0057157 A1* | 3/2004 | Shimizu et al. | 360/135 |
| 2005/0123805 A1 | 6/2005 | Shimizu et al. | |
| 2005/0204777 A1* | 9/2005 | Mori et al. | 65/112 |
| 2006/0042317 A1* | 3/2006 | Miyamoto | 65/61 |

FOREIGN PATENT DOCUMENTS

| | | |
|---|---|---|
| JP | 9-102120 A | 4/1997 |
| JP | 10-154321 A | 6/1998 |
| JP | 2002-163817 A | 6/2002 |
| JP | 2004-039030 A | 2/2004 |
| WO | WO 2004/061829 A1 | 7/2004 |

* cited by examiner

US 7,727,645 B2

SUBSTRATE FOR MAGNETIC RECORDING MEDIUM, MAGNETIC RECORDING MEDIUM, AND MAGNETIC RECORDING AND REPRODUCING APPARATUS

CROSS REFERENCE TO RELATED APPLICATIONS

This application claims priority based on Japanese Patent Application No. 2005-200628, filed Jul. 8, 2005, and claims benefit of U.S. Provisional Application No. 60/700,338 filed on Jul. 19, 2005.

TECHNICAL FIELD

The present invention relates to a substrate for forming a magnetic recording medium employed as a recording medium for information devices, to a magnetic recording medium, and to a magnetic recording and reproducing apparatus.

BACKGROUND ART

In recent years, with the progress of various information devices, the storage capacity of magnetic recording media has increased more and more. Particularly, the recording capacity and recording density of magnetic disks, which play a central role as external memories in computers, have been increasing year by year. Under such circumstances, there is a need for development of a magnetic disk which enables higher-density recording. For example, development of laptop and palmtop personal computers has required a small-sized recording apparatus with high impact resistance, and therefore, demand has arisen for a small-sized magnetic recording medium which enables higher-density recording and has high mechanical strength. Recently, navigation systems and portable music playback devices have also employed a recording apparatus incorporating an ultra small magnetic recording medium.

Conventionally, such a magnetic recording medium (i.e., magnetic disk) has employed an aluminum alloy substrate having an NiP-plated surface, or a glass substrate, which satisfies strict requirements, including higher impact resistance, rigidity, hardness, and chemical durability. Such a glass substrate is advantageous in that it enables easy formation of a flat surface suitable for reduction of the flying height of a magnetic head flying above a magnetic recording surface, the flying height reduction being important for attaining high-density magnetic recording.

In recent years, the flying height of a magnetic head flying above a magnetic recording medium has been reduced more and more for attaining high-density recording, and in accordance with this tendency, a substrate for forming a magnetic recording medium (hereinafter may be referred to as a "magnetic recording medium substrate" or a "magnetic recording medium substrate product") has been required to have a flat surface with small surface roughness (e.g., a mirror surface) and to have minimized surface defects such as microscratches and micropits.

A magnetic recording medium substrate (e.g., a hard disk (HD) substrate) is produced through the following steps: a step of roughly polishing (lapping) the surface of a substrate body which has been formed to have desired dimensions; a step of chamfering the inner and outer end surfaces of the substrate body through grinding; and a step of subjecting the substrate body surface to final polishing. Subsequently, layers are formed atop the substrate body surface through, for example, the following steps: a texturing step in which the substrate body surface is moderately roughened; a step of forming an underlayer on the surface of the substrate; a step of forming a magnetic layer on the surface of the underlayer; a step of forming a protective layer on the magnetic layer; and a step of forming a lubrication layer on the protective layer. Thereafter, irregular protrusions formed on the layer surface are removed through a burnishing step, to thereby yield a magnetic recording medium as a final product.

The thus-produced substrate may cause a problem in that exfoliation of the underlayer or the magnetic layer occurs at a chamfered portion of the substrate body, resulting in production of defective products. In order to solve this problem, there has been proposed means for enhancing the durability of the layers formed atop the substrate body, in which the average surface roughness (Ra) of the chamfered portion is regulated to less than 0.20 μm (see, for example, Patent Document 1).

In the case where the flying height of a magnetoresistive head is reduced for enhancing recording density, when data recorded on a magnetic recording medium are reproduced by the head, a reproduction error may occur, or the data may fail to be reproduced. Such a phenomenon is caused by the following mechanism: projections formed of particles deposited on the surface of the magnetic recording medium induce thermal asperity and generate heat in the magnetoresistive head, and such heat generation varies the resistance of the head, which adversely affects electromagnetic conversion characteristics. Particles which adversely affect flying of the head (e.g., angular particles or particles which rise relatively sharply with respect to the medium (disk) surface) were found to be generated through unintentional rubbing of the end surfaces of a magnetic recording medium substrate with a storage cassette when the substrate is stored in the cassette and conveyed during production of the magnetic recording medium. Conceivably, when the substrate, whose end surfaces (including a chamfered portion and a substrate side wall) do not assume mirror surfaces, is placed into or removed from the storage cassette formed of polycarbonate or a similar material, the substrate end surfaces come into contact with the inner wall of the storage cassette, and the aforementioned particles are generated from the end surfaces and are deposited on the surface of the magnetic recording medium. In order to solve such a problem, there has been proposed a technique for regulating the average surface roughness (Ra) of the surface of at least one of the chamfered portion and the side wall of the substrate to less than 1 μm; i.e., a technique for forming a mirror surface (see, for example, Patent Document 2).

Patent Document 1: Japanese Patent Application Laid-Open (kokai) No. 09-102120
Patent Document 2: Japanese Patent Application Laid-Open (kokai) No. 10-154321

DISCLOSURE OF INVENTION

Conventionally, a magnetic recording medium including a perpendicular magnetic recording layer has employed a soft magnetic underlayer formed from an alloy containing Fe, Co, etc. However, corrosion, which is attributed to the thickness of the thus-formed soft magnetic layer and the corrosive property inherent to such an alloy material, may occur in the soft magnetic layer in the vicinity of an end surface of a substrate at which contact between the layer and the substrate per se is weak. Such corrosion has been shown to cause considerable deterioration of electromagnetic conversion characteristics of the magnetic recording medium, and therefore, measures against the corrosion have been required. Studies on the relation between the surface roughness of the substrate and the bonding strength of the soft magnetic underlayer have shown that when the surface roughness of the substrate end surface is regulated to a level which has conventionally been proposed, sufficient tight contact is not established between the substrate end surface and the soft magnetic layer, and thus corrosion occurs in the soft magnetic layer (i.e., corrosive layer), whereby high bonding strength fails to be attained.

An object of the present invention is to provide a magnetic recording medium substrate product which enables enhancement of contact strength between a substrate end surface and a soft magnetic layer, as well as suppression of occurrence of corrosion. Another object of the present invention is to provide a magnetic recording medium comprising the substrate product, which exhibits no deterioration of electromagnetic conversion characteristics and has excellent durability. Another object of the present invention is to provide a magnetic recording and reproducing apparatus comprising the magnetic recording medium.

In order to achieve the aforementioned objects, the present invention provides the following:

(1) a magnetic recording medium substrate product comprising a disk-shaped non-magnetic substrate having a circular hole in a center portion thereof, and having a chamfer formed at least one of a portion between a main surface on which a magnetic layer is to be formed and an outer end surface and a portion between the main surface and an inner end surface defining the circular hole, wherein the chamfer has a surface roughness (Ra) falling within a range of 4.0 Å$\leq$Ra$\leq$100 Å as measured by means of an AFM;

(2) a magnetic recording medium substrate product as described in (1), wherein the chamfer has a surface roughness (Ra) falling within a range of 4.0 Å$\leq$Ra$\leq$50 Å as measured by means of an AFM;

(3) a magnetic recording medium substrate product as described in (1) or (2), wherein the outer end surface has a surface roughness (Ra) falling within a range of 4.0 Å$\leq$Ra$\leq$100 Å as measured by means of an AFM;

(4) a magnetic recording medium substrate product as described in (3), wherein the outer end surface has a surface roughness (Ra) falling within a range of 4.0 Å$\leq$Ra$\leq$50 Å as measured by means of an AFM;

(5) a magnetic recording medium substrate product as described in any one of (1) through (4), wherein a curved surface (i.e., a round surface, which hereinafter may be referred to as "R surface") of the corner portion between the substrate main surface and the chamfer has a surface roughness (Ra) falling within a range of 4.0 Å$\leq$Ra$\leq$50 Å as measured by means of an AFM;

(6) a magnetic recording medium substrate product as described in any one of (1) through (5), wherein the inner end surface defining the circular hole has a surface roughness (Ra) falling within a range of 4.0 Å$\leq$Ra$\leq$100 Å as measured by means of an AFM;

(7) a magnetic recording medium substrate product as described in any one of (1) through (6), wherein the non-magnetic substrate is formed of any of amorphous glass, crystallized glass, silicon, and aluminum;

(8) a magnetic recording medium comprising a magnetic recording medium substrate product as recited in any one of (1) through (7) above, and a perpendicular magnetic recording medium layer on a main surface of the substrate product; and (9) a magnetic recording and reproducing apparatus comprising a magnetic recording medium as recited in (8) above.

When a chamfer is formed so as to attain such a small surface roughness, contact strength between the chamfer and a soft magnetic layer is enhanced, and occurrence of corrosion in the soft magnetic layer can be suppressed. Therefore, the resultant magnetic recording medium exhibits no deterioration of electromagnetic conversion characteristics. As a result, there can be effectively resolved problems that conventionally arise, including reading error due to SNR reduction at the outer periphery of a magnetic recording medium, and erasure failure of adjacent signals due to side writing caused by unstable flying of a magnetic head, which unstable flying occurs when the head flies in the vicinity of a corroded portion generated at the outer periphery and the corroded portion is deposited onto the surface of the head.

Figure 1A:
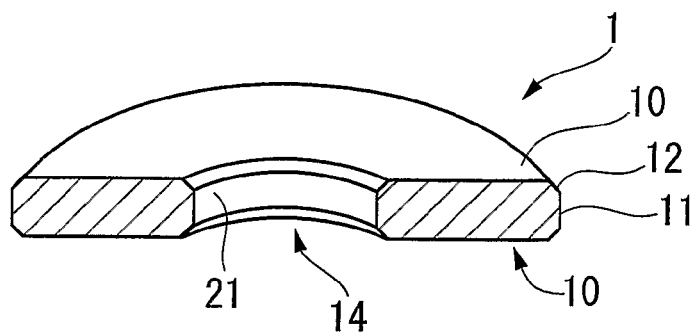
FIG. 1A is a perspective view showing the cut substrate product of a magnetic recording medium substrate product of the present invention.

DESCRIPTION OF REFERENCE NUMERALS IN FIGS.

1. Magnetic recording medium substrate product
5. Spacer 5a. End portion of spacer
6. Stacked-substrate body
7, 17. Brush
10. Main surface
11. Outer end surface
12, 22. Chamfer
13, 23. R surface
14. Inner hole
15. Corner portion
21. Inner end surface
26. Medium-driving section
27. Magnetic head
28. Head-driving section
29. Recorded/reproduced-signal-processing system
30. Magnetic recording medium
40. Magnetic recording and reproducing apparatus

BEST MODE FOR CARRYING OUT THE INVENTION

Figure 1B:
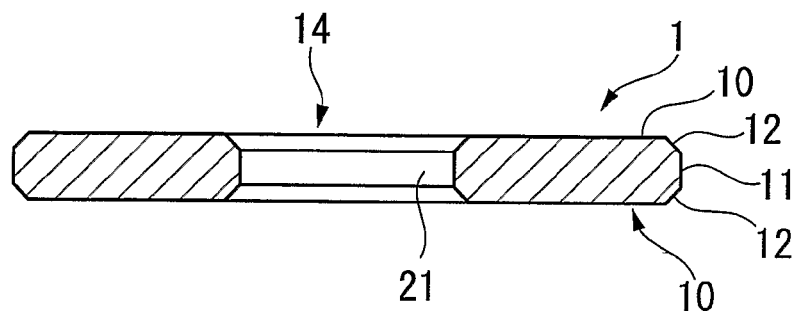
FIG. 1B is a cross-sectional view of the substrate product of a magnetic recording medium substrate product of the present invention.
Figure 2:
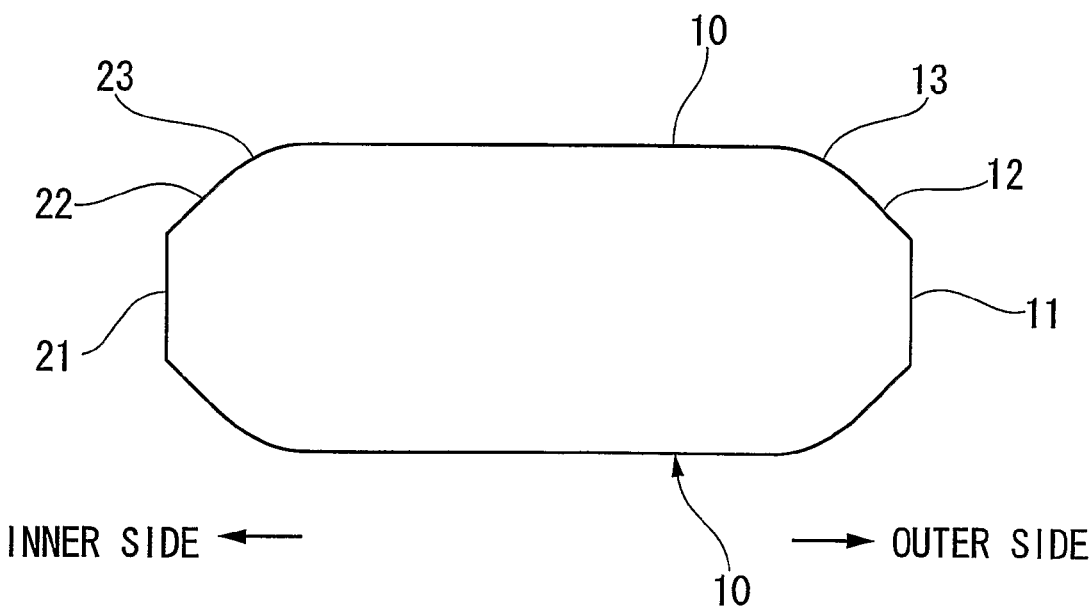
FIG. 2 is an enlarged cross-sectional view for describing portions of the magnetic recording medium substrate product of the present invention.

The present invention will next be described in detail. FIGS. 1A and 1B show a magnetic recording medium substrate product of the present invention. FIG. 1A is a perspective view showing the cut magnetic recording medium substrate product of the present invention, and FIG. 1B is a cross-sectional view of the substrate product. FIG. 2 is an enlarged cross-sectional view for describing portions of the magnetic recording medium substrate product of the present invention of FIGS. 1A and 1B.

As shown in FIGS. 1A and 1B, the magnetic recording medium substrate product 1 of the present invention is formed of a doughnut-shaped disk. The disk has, on its top and bottom, main surfaces 10, on which a magnetic recording layer is to be formed. The disk has, on its outer periphery, an outer end surface 11. The disk has, in its center portion, a circular hole 14 which is defined by an inner end surface 21. Chamfered portions (chamfers) 12, are formed between the main surfaces 10, and the outer end surface 11. Also, chamfered portions (chamfers) 22, are formed between the main surfaces 10, and the inner end surface 21.

FIG. 2 is an enlarged cross-sectional view for describing portions of the magnetic recording medium substrate product of the present invention of FIGS. 1A and 1B. FIG. 2 shows an example in which an R surface 13 having a radius of 13 to 80 μm is formed between the main surface 10 and the chamfered portion (chamfer) 12. The R surface 13 has the effect of suppressing generation of particles even if end surfaces of the substrate product are rubbed with a cassette when the substrate product is stored in the cassette and conveyed during production of the magnetic recording medium.

The substrate employed in the present invention may be an amorphous glass substrate, a crystallized glass substrate, a single-crystal silicon (Si) substrate, an NiP-plated Al substrate, or an NiP-plated Al alloy substrate. The amorphous glass substrate to be employed may be a chemically strengthened glass substrate or a non-strengthened glass substrate. The silicon substrate to be employed may be a high-purity single-crystal substrate used for semiconductor wafers, an impurity-doped substrate, or a polycrystalline substrate.

Firstly, the substrate (disk-shaped substrate) employed in the present invention is subjected to lapping for the purpose of enhancing the form accuracy and dimensional accuracy of the substrate. The lapping is generally performed in two steps by means of a lapping apparatus.

Subsequently, a number of unit substrates are bundled together with a spacer being provided between adjacent substrates, to thereby prepare a stacked-substrate body. A circular hole is formed in the center of the stacked substrate, and then the inner and outer end surfaces of the stacked-substrate body are subjected to predetermined chamfering.

Subsequently, the resultant outer and inner end surfaces are polished with a polishing brush. In the method for producing the magnetic recording medium substrate product of the present invention, the aforementioned steps (from the circular hole formation to the inner and outer end surface polishing) are performed on the stacked-substrate body in a batch process.

Finally, main surfaces on which a magnetic recording layer is to be provided are subjected to polishing. The polishing is performed in two steps; i.e., a first polishing step of removing scratches or strains generated through the above-described process, and a second polishing step of forming a mirror surface.

Each of the thus-polished substrates is completely washed, and then subjected to testing. Thus, the magnetic recording medium substrate product is produced.

In the magnetic recording medium substrate product, an important point is the finishing accuracy of the chamfered portion (chamfer) and the outer and inner end surfaces. Conventionally, the finishing accuracy of such a surface has been defined by a surface roughness as measured through the stylus method, which is a generally employed surface roughness measuring method. However, in a magnetic recording medium having such a conventional finishing accuracy, a soft magnetic layer exhibits low contact strength in the vicinity of the boundary between the substrate main surface and the chamfered portion (chamfer), and thus corrosion occurs in the soft magnetic layer, leading to deterioration of electromagnetic conversion characteristics.

Therefore, in the magnetic recording medium substrate product of the present invention, the finishing accuracy is defined by a surface roughness as measured by means of an atomic force microscope (AFM), which enables more accurate measurement.

An atomic force microscope (AFM) is a device for observing the two-dimensional structure of the surface of a sample by measuring force between substances at the atomic level. Specifically, an AFM employs a cantilever (probe) having a pointed tip, and scans the surface of a sample while controlling the height, direction, or position of the cantilever such that the atomic force between the cantilever tip and the sample surface becomes constant. The displacement of the cantilever, which moves vertically in accordance with irregularities of the sample surface, is detected through irradiation with laser light, and a change in position of the reflected laser light is detected by means of a photodiode. An AFM can detect nano-order irregularities; i.e., microirregularities which cannot be measured through the stylus method.

In the magnetic recording medium substrate product of the present invention, the surface roughness (Ra) of the aforementioned chamfer is regulated so as to fall within a range of $4.0 \text{ Å} \leq Ra \leq 100 \text{ Å}$, preferably $4.0 \text{ Å} \leq Ra \leq 50 \text{ Å}$, as measured by means of an AFM. The lower limit of Ra; i.e., 4.0 Å, is also the processable or measurable lower limit. When Ra is 50 Å or less, no corrosion occurs. However, when Ra exceeds 50 Å, the contact strength of a soft magnetic layer is lowered, and corrosion may occur in the soft magnetic layer. When Ra exceeds 100 Å, corrosion is increasingly likely to occur, and thus electromagnetic conversion characteristics are deteriorated. Therefore, the surface roughness (Ra) of the chamfer is regulated so as to fall within a range of $4.0 \text{ Å} \leq Ra \leq 100 \text{ Å}$, preferably $4.0 \text{ Å} \leq Ra \leq 50 \text{ Å}$, as measured by means of an AFM.

In the magnetic recording medium substrate product of the present invention, as in the case of the chamfer, the surface roughness (Ra) of the outer end surface is regulated so as to fall within a range of $4.0 \text{ Å} \leq Ra \leq 100 \text{ Å}$, preferably $4.0 \text{ Å} \leq Ra \leq 50 \text{ Å}$, as measured by means of an AFM.

In the case where the surface roughness of the outer end surface is regulated to such a minute level, when the substrate is stored in a cassette and conveyed, the risk of damage to the outer end surface can be reduced, and problems associated with generation of particles can be avoided.

As shown in FIG. 2, in the magnetic recording medium substrate product of the present invention, preferably, a curved surface (R surface) having a radius of 0.01 mm or more and 0.05 mm or less is provided at a corner portion between the substrate main surface and the chamfer on the outer end surface side, or at a corner portion between the substrate main surface and the chamfer on the circular hole side. The surface roughness (Ra) of the curved surface (R surface) is also regulated so as to fall within a range of $4.0 \text{ Å} \leq Ra \leq 100 \text{ Å}$, preferably $4.0 \text{ Å} \leq Ra \leq 50 \text{ Å}$, as measured by means of an AFM.

In the case where such a curved surface is provided at the corner portion between the main surface and the chamfer, when the substrate is stored in a cassette and conveyed, the risk of damage to the outer end surface can be reduced, and problems associated with generation of particles can be avoided. When the surface roughness (Ra) of the R surface is regulated so as to fall within a range of 4.0 Å≦Ra≦100 Å, preferably 4.0 Å≦Ra≦50 Å, as measured by means of an AFM, the contact strength of the soft magnetic layer is enhanced, and no corrosion occurs in the soft magnetic layer, resulting in no deterioration of electromagnetic conversion characteristics.

As described above, when the surface roughness of the corner portion between the main surface and the outer or inner end surface is regulated so as to fall within a range of 4.0 Å≦Ra≦100 Å, preferably 4.0 Å≦Ra≦50 Å, as measured by means of an AFM, the contact strength of the soft magnetic layer is enhanced at the corner portion between the main surface and the outer or inner end surface, and therefore no corrosion occurs in the soft magnetic layer; i.e., the resultant magnetic recording medium substrate product exhibits remarkably preferable characteristics.

In the magnetic recording medium substrate product of the present invention, preferably, the surface roughness (Ra) of the aforementioned chamfer, the outer end surface, or the curved surface (R surface) is also regulated so as to fall within a range of 4.0 Å≦Ra≦10 Å, 10 Å≦Ra≦100 Å preferably 4.0 Å≦Ra≦10 Å, 10 Å≦Ra≦50 Å, as measured by means of an AFM.

Next will be described a polishing method for obtaining the magnetic recording medium substrate product of the present invention.

The substrate employed in the present invention is subjected to lapping for the purpose of enhancing the form accuracy and dimensional accuracy of the substrate. Thereafter, a circular hole is formed in the center of the substrate, and then the inner and outer end surfaces of the substrate are subjected to predetermined chamfering.

Figure 3:
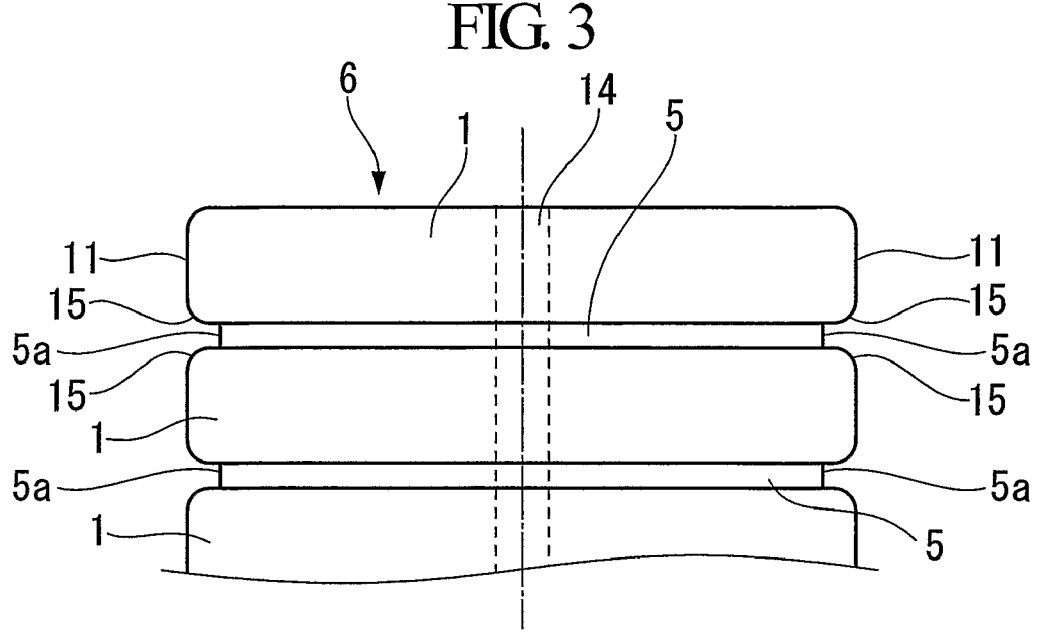
FIG. 3 illustrates the configuration of a stacked-substrate body.

Polishing of the corner portion including the chamfer formed between the main surface and the outer or inner end surface is carried out as shown in, for example, FIG. 3. Specifically, polishing is performed on a stacked-substrate body 6 formed by laminating a number of magnetic recording medium substrates 1 via spacers 5.

Each spacer 5, which assumes a disk shape and has, on its center, a circular hole 14 as in the case of the magnetic recording medium substrate 1, is provided such that the end portion (end surface) 5a of the spacer 5 is located about 0 to about 2 mm inward (preferably about 0.5 to about 2 mm inward) from the end of the chamfer of a corner portion 15 of the magnetic recording medium substrate 1. The thickness of the spacer 5 is preferably about 0.1 to about 0.3 mm. The spacer 5 is preferably formed of a material softer than that of the substrate, such as polyurethane, an acrylic material, a plastic material, or the same material as that of a polishing pad employed in the polishing step.

Figure 4:
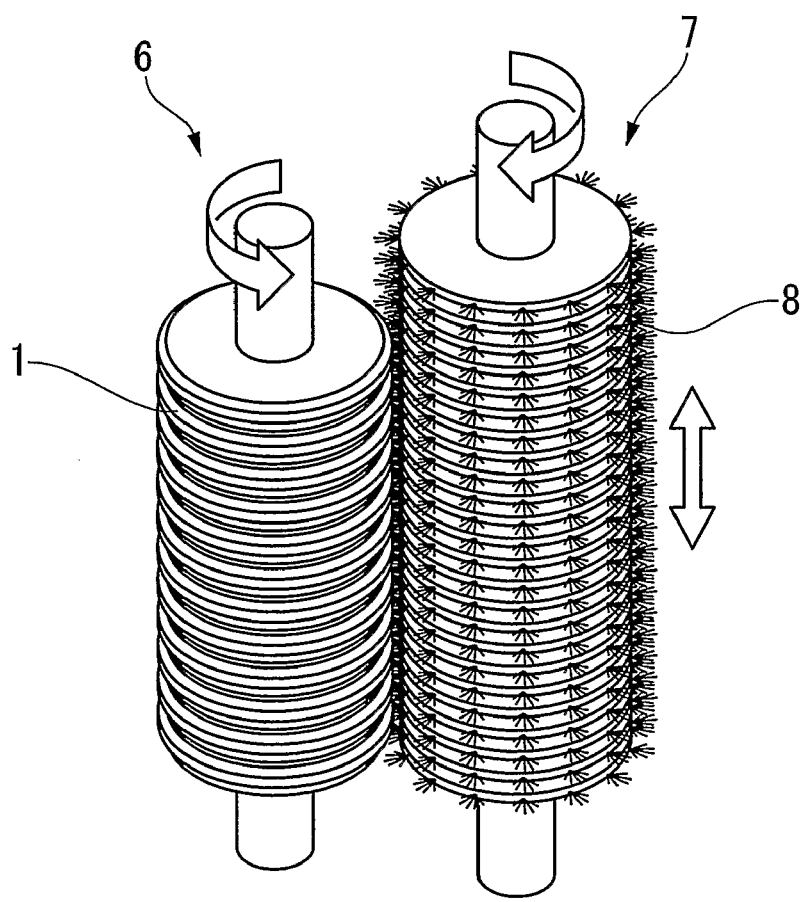
FIG. 4 illustrates a method for polishing the outer periphery of the stacked-substrate body.

In order to polish the corner portion including the chamfer of the outer end surface, as shown in FIG. 4, the outer periphery of the stacked-substrate body 6 is polished with a rotatable polishing brush 7. The polishing brush 7 to be employed is preferably a tubular brush (diameter: 200 to 500 mm) formed by spirally arranging polyamide fiber filaments, each having a diameter of 0.05 mm to 0.3 mm and a length of 1 to 10 mm.

The outer end surface and corner portion of the substrate is polished through the following procedure: the tubular polishing brush 7 is pressed onto the outer periphery of the stacked-substrate body 6; and, while a polishing liquid is supplied to the contact surface between the outer periphery of the stacked-substrate body 6 and the polishing brush 7, the stacked-substrate body 6 is rotated at about 60 rpm, and the tubular polishing brush 7 is rotated at about 700 to about 1,000 rpm in a direction opposite to that of the stacked-substrate body 6 and is moved up and down vertically. This polishing is performed such that the corner portion is mirror-finished so as to attain a surface roughness (Ra) of 4.0 Å≦Ra≦100 Å, preferably 4.0 Å≦Ra≦50 Å, as measured by means of an AFM in a 10 μm field of view.

Figure 5:
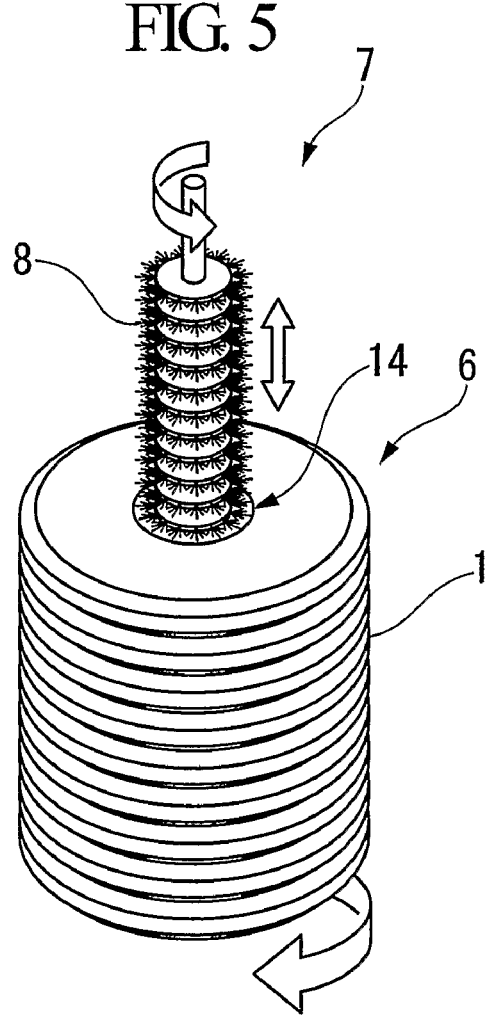
FIG. 5 illustrates a method for polishing the inner periphery of the stacked-substrate body.

In order to polish the corner portion including the chamfer of the inner end surface, as shown in FIG. 5, polishing is performed with a rotatable brush 17 which is inserted into an inner hole 14 of the stacked-substrate body 6 formed by laminating the magnetic recording medium substrates 1 via the spacers. This inner-hole polishing is also performed such that the corner portion is mirror-finished so as to attain a surface roughness (Ra) of 4.0 Å≦Ra≦100 Å, preferably 4.0 Å≦Ra≦50 Å, as measured by means of an AFM in a 10 μm field of view.

The polishing accuracy is controlled by appropriately determining, for example, the material, diameter, hardness, and length of the brush to be employed, the type, particle size, and concentration of the polishing material to be employed, the brush pressing pressure, the rotation speed of the brush, the vertical movement speed of the brush, and the rotation speed of the stacked-substrate body.

In the case where an R surface is provided between the chamfer and the main surface (data surface) on which a magnetic layer is to be formed, the curvature radius of the R surface is preferably formed to be 0.01 to 0.05 mm.

Figure 6:
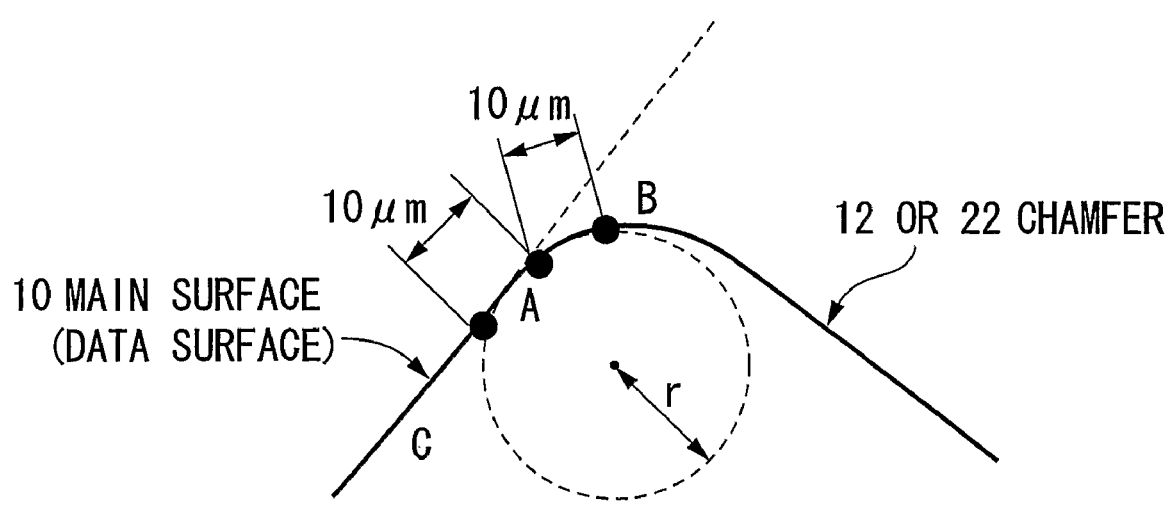
FIG. 6 illustrates a method for measuring the R surface curvature.

As used herein, "the curvature radius of the R surface" is obtained as follows. As shown in FIG. 6, the point at which a line extending from the substrate main surface (data surface) deviates from the profile curve of the substrate surface is named point A. The points on the substrate surface which are located 10 μm away from point A in opposite directions are named points B and C. "The curvature radius of the R surface" is the radius of a circle which passes through these points A, B, and C (hereinafter the curvature radius may be referred to as "the R surface curvature radius").

A magnetic layer is formed on the surface of the non-magnetic substrate which has been processed so as to attain the aforementioned surface roughness. The magnetic layer may be a longitudinal magnetic recording layer or a perpendicular magnetic recording layer. In the case where a perpendicular magnetic recording layer is formed, the present invention exhibits particularly remarkable effects. Such a magnetic recording layer is preferably formed of an alloy containing Co as a predominant component.

For example, a magnetic recording layer for a longitudinal magnetic recording medium may have a multi-layer structure including a non-magnetic CrMo underlayer and a ferromagnetic CoCrPtTa layer.

A magnetic recording layer for a perpendicular magnetic recording medium may have a multi-layer structure including a soft magnetic layer formed of, for example, a soft magnetic alloy such as an FeCo alloy (e.g., FeCoB, FeCoSiB, FeCoZr, FeCoZrB, or FeCoZrBCu), an FeTa alloy (e.g., FeTaN or FeTaC), or a Co alloy (e.g., CoTaZr, CoZrNB, or CoB); an orientation-regulating film formed of, for example, Pt, Pd, NiCr, or NiFeCr; an intermediate film formed of, for example, Ru (which is provided if necessary); and a magnetic layer formed of a 60Co-15Cr-15Pt alloy or a 70Co-5Cr-15Pt-10SiO$_2$ alloy.

The thickness of the magnetic recording layer is regulated to 3 nm or more and 20 nm or less, preferably 5 nm or more and 15 nm or less. The thickness of the magnetic recording layer may be appropriately predetermined in accordance with the type of a magnetic alloy to be employed and the multi-layer structure to be formed, so long as a sufficient head input/output performance is attained. In general, a magnetic layer is required to have a thickness of a certain level or more in order to attain an output of a predetermined level or more during reproduction, and parameters representing recording/reproduction characteristics are reduced in accordance with an increase in output. Therefore, the thickness of the magnetic recording layer must be regulated to an optimal level.

The magnetic recording layer is generally formed as a thin film through a physical vapor deposition technique such as sputtering, vacuum deposition, deposition in atmosphere gas, or gas flow sputtering.

A protective film layer is formed on the surface of the magnetic recording layer. The protective film layer may be formed of a generally employed protective film layer material; for example, a carbonaceous material such as carbon (C), hydrocarbon (HxC), carbon nitride (CN), amorphous carbon, or silicon carbide (SiC); $SiO_2$; $Zr_2O_3$; or TiN. The protective film layer may be formed of two or more layers.

The thickness of the protective film layer must be regulated to less than 10 nm. This is because when the thickness of the protective film layer exceeds 10 nm, the distance between a magnetic head and the magnetic layer becomes wide, and thus sufficiently high input/output signals fail to be attained.

The protective film layer is generally formed through sputtering.

Preferably, a lubrication layer is formed on the protective film layer. Examples of the lubricant employed for forming the lubrication layer include a fluorine-containing lubricant, a hydrocarbon-containing lubricant, and a mixture thereof. The lubrication layer is generally formed to have a thickness of 1 to 4 nm.

Figure 7:
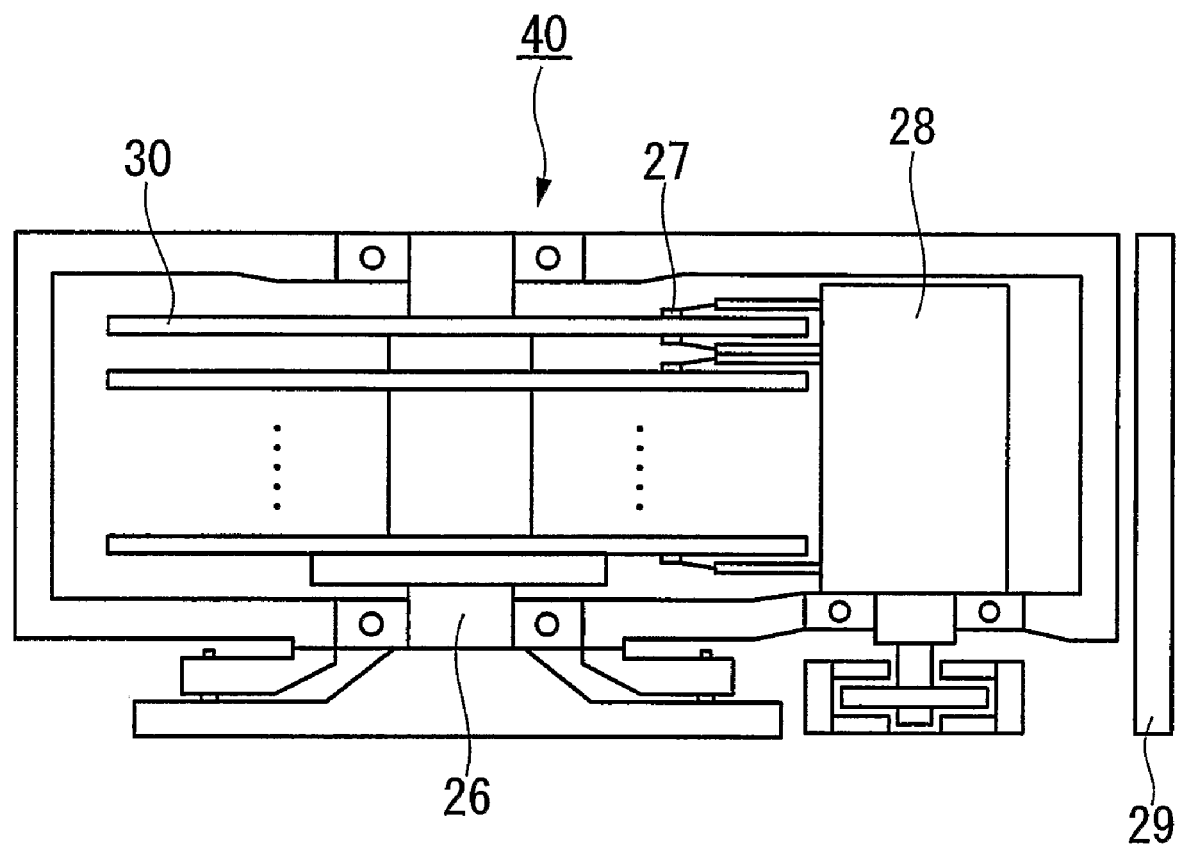
FIG. 7 shows the configuration of the magnetic recording and reproducing apparatus of the present invention.

FIG. 7 shows the configuration of the magnetic recording and reproducing apparatus of the present invention. The magnetic recording and reproducing apparatus 40 of the present invention includes the aforementioned magnetic recording medium 30 of the present invention; a medium-driving section 26 which drives the magnetic recording medium in a recording direction; a magnetic head 27 having a recording unit and a reproduction unit; a head-driving section 28 which drives the magnetic head 27 relative to the magnetic recording medium 30; and a recorded/reproduced-signal-processing system 29 incorporating recorded/reproduced-signal-processing means for inputting signals into the magnetic head 27 and for reproducing signals output from the magnetic head 27. The magnetic recording and reproducing apparatus, which incorporates these components, can attain high recording density.

In the magnetic recording medium employed in the magnetic recording and reproducing apparatus of the present invention, the vicinities of the outer periphery and the inner hole of the substrate are finely polished and finished. Accordingly, high contact strength is attained between the substrate and the magnetic recording medium layer, and thus no corrosion occurs in the magnetic recording medium layer, resulting in no deterioration of electromagnetic conversion characteristics. Therefore, the magnetic recording and reproducing apparatus maintains reliable performance over a long period of time.

EXAMPLES

There were employed glass substrates (amorphous glass substrates and crystallized glass substrates) and silicon substrates (single-crystal silicon substrates for semiconductors). Each substrate was processed to have an outer diameter of 48 mm, an inner diameter of 12 mm, and a thickness of 0.508 mm, and then washed.

The substrate samples were formed into a stacked layer body as shown in FIG. 3, and then subjected to brush polishing through the method as shown in FIGS. 4 and 5, to thereby prepare magnetic recording medium substrate products in which the surface roughness (Ra) of the chamfer was regulated to 4.0 Å or more and 100 Å or less as measured by means of an AFM, the surface roughness (Ra) of the outer or inner end surface was regulated to 4.0 Å or more and 100 Å or less, and the R surface curvature was regulated to 0.01 mm or more and 0.07 mm or less.

Subsequently, each of the thus-prepared substrate products was placed in a film formation chamber of a DC magnetron sputtering apparatus (C-3010, product of ANELVA), and the film formation chamber was evacuated to attain a vacuum of $1 \times 10^{-5}$ Pa. Thereafter, on the substrate product was formed a soft magnetic underlayer including the following three films: a soft magnetic film (50 nm) of 90Co-4Zr-6Nb (Co content: 90 at %, Zr content: 4 at %, Nb content: 6 at %), an Ru film (0.8 nm), and a film (50 nm) of 90Co-4Zr-6Nb (Co content: 90 at %, Zr content: 4 at %, Nb content: 6 at %). During the layer formation, the substrate was not heated, and a magnetic field was applied to the substrate in a radial direction (from the outer periphery toward the inner periphery).

Subsequently, an Ru orientation-regulating film (20 nm) and a 66Co-8Cr-18Pt-8$SiO_2$ perpendicular magnetic recording layer (12 nm) were formed.

Subsequently, an amorphous carbon protective film (4 nm) was formed through CVD.

Subsequently, a perfluoropolyether lubrication film was formed through dipping, to thereby yield a magnetic recording medium.

Comparative Examples 1 through 19

The procedure of the Examples was repeated, except that the substrate was not subjected to polishing (e.g., brush polishing of the end surface), or the substrate was subjected to polishing such that the surface roughness of the chamfer was regulated to 100 Å or more as measured by means of an AFM, the surface roughness of the outer or inner end surface was regulated to 100 Å or more, and the R surface curvature was regulated to 0.01 mm or more and 0.04 mm or less, to thereby yield a magnetic recording medium.

Comparative Examples 20 Through 22

For comparison with the case of a longitudinal magnetic recording medium, a conventional substrate whose outer end surface had not undergone brush polishing was heated to attain a surface temperature of 170° C. by means of a DC magnetron sputtering apparatus, and then a Cr50-Ti alloy film (200 Å), an Ni50-Al alloy film (100 Å), a Cr20-Ti alloy film (50 Å), and a Co13-Cr6-Pt3-B alloy film (30 Å) were formed on the thus-heated substrate, to thereby yield a magnetic recording medium.

Each of the thus-obtained magnetic recording media of the Examples and the Comparative Examples was evaluated in terms of surface roughness of the substrate outer end surface, R surface curvature, and SNR characteristics (i.e., recording and reproduction characteristics). The presence or absence of film exfoliation was confirmed in the vicinity of the main surface and the chamfer, and the number of exfoliated portions was counted.

[Evaluation of Surface Roughness by AFM]

The substrate surface roughness (Ra) was evaluated by means of an AFM device (NanoScopeIIIa) manufactured by Veeco Instrument. The surface roughness measurement was performed under the following conditions:
Probe: silicon single crystal probe, D-NCH-10V (Nanosensors)
field of view: 10 μm
Pixel number: 256×256 data points,
Scan mode: tapping mode,
Scan rate: 1 μm/sec
[Measurement environment: at room temperature in the atmosphere]
Data processing: using "NanoScope ver5.30r2".

[Measurement of R Surface Curvature]

The R surface curvature was measured through the method as shown in FIG. 6 by means of Contracer CV-L400 (product of Mitutoyo Corporation). The measurement was performed under the following conditions.
Range: 1 mm
Speed: 0.02 mm/sec,
Pitch: 0.002 mm,

[Evaluation of Perpendicular Magnetic Recording Medium]

Recording and reproduction characteristics were evaluated by means of read/write analyzer RWA1632 and spin stand S1701MP (products of GUZIK (US)).

In order to evaluate recording and reproduction characteristics, SNR was measured by means of a magnetic head including a single magnetic pole (recording unit) and a GMR element (reproduction unit) at a track-recording density (recording frequency) of 1,000 kFCI.

[Evaluation of Film Exfoliation Caused by Corrosion]

Each of the magnetic recording media obtained in the Examples and the Comparative Examples was placed in an oven (temperature: 70° C., humidity: 80%) for 240 hours. Thereafter, each of the magnetic recording media was taken out from the oven, and the vicinity of the boundary between the data surface and outer end surface of each of the magnetic recording media was observed under a microscope at a magnification of 240. The presence or absence of film exfoliation caused by corrosion was confirmed at the boundary region between the chamfer and the data surface, and the number of exfoliated portions was counted.

The evaluation results are shown in Tables 1 and 2.

TABLE 1

| | No. | Substrate material | Outer chamfer average roughness Å | Inner chamfer average roughness Å | Outer end surface average roughness (Ra) Å | Inner end surface average roughness (Ra) Å | Outer R surface curvature (R) mm | Inner R surface curvature (R) mm | Film exfoliation portions numbers/surface | SNR dB |
|---|---|---|---|---|---|---|---|---|---|---|
| Example | 1 | Amorphous | 77 | 87 | 99 | 85 | 0.024 | 0.022 | 3 | 16.1 |
| | 2 | glass | 79 | 82 | 76 | 73 | 0.032 | 0.031 | 3 | 16.2 |
| | 3 | | 49 | 32 | 53 | 34 | 0.042 | 0.042 | 2 | 16.1 |
| | 4 | | 28 | 45 | 21 | 19 | 0.025 | 0.024 | 0 | 16.4 |
| | 5 | | 14 | 17 | 7 | 16 | 0.028 | 0.027 | 0 | 16.5 |
| | 6 | | 5.8 | 5.6 | 4.5 | 7.8 | 0.047 | 0.047 | 0 | 16.5 |
| | 7 | Crystallized | 76 | 67 | 84 | 67 | 0.067 | 0.065 | 2 | 15.6 |
| | 8 | glass | 33 | 23 | 34 | 42 | 0.055 | 0.052 | 0 | 15.5 |
| | 9 | | 12 | 15 | 17 | 12 | 0.031 | 0.029 | 0 | 15.6 |
| | 10 | | 4.8 | 13.2 | 5.2 | 5.8 | 0.019 | 0.018 | 0 | 15.6 |
| | 11 | Single- | 77 | 45 | 64 | 69 | 0.032 | 0.032 | 1 | 16.3 |
| | 12 | crystal | 51 | 33 | 45 | 38 | 0.064 | 0.062 | 0 | 16.2 |
| | 13 | silicon | 23 | 21 | 25 | 17 | 0.034 | 0.032 | 0 | 16.7 |
| | 14 | | 11 | 7 | 9 | 10 | 0.021 | 0.019 | 0 | 16.6 |
| | 15 | | 6.2 | 6.3 | 5.3 | 6.3 | 0.044 | 0.044 | 0 | 16.5 |

TABLE 2

| | No. | Substrate material | Outer chamfer average roughness Å | Inner chamfer average roughness Å | Outer end surface average roughness (Ra) Å | Inner end surface average roughness (Ra) Å | Outer R surface curvature (R) mm | Inner R surface curvature (R) mm | Film exfoliation portions numbers/surface | SNR dB |
|---|---|---|---|---|---|---|---|---|---|---|
| Comp. Ex. | 1 | Amorphous | 132 | 198 | 150 | 325 | 0.023 | 0.022 | 13 | 15.1 |
| | 2 | glass | 321 | 293 | 200 | 156 | 0.024 | 0.022 | 17 | 15 |
| | 3 | | 459 | 456 | 500 | 342 | 0.032 | 0.032 | 18 | 14.9 |
| | 4 | | 154 | 199 | 120 | 198 | 0.009 | 0.009 | 19 | 14.7 |
| | 5 | | 287 | 331 | 200 | 287 | 0.001 | 0.003 | 39 | 14.5 |
| | 6 | | 673 | 763 | 500 | 456 | 0.004 | 0.002 | 62 | 13.2 |
| | 7 | | 984 | 873 | 1,000 | 1,239 | 0.005 | 0.005 | 78 | 12.4 |
| | 8 | Crystallized | 187 | 278 | 155 | 199 | 0.007 | 0.007 | 21 | 14.6 |
| | 9 | glass | 322 | 379 | 321 | 435 | 0.005 | 0.005 | 54 | 13.3 |
| | 10 | | 2,765 | 2,213 | 2,300 | 2,213 | 0.008 | 0.008 | 72 | 12.7 |
| | 11 | Single- | 198 | 283 | 189 | 289 | 0.007 | 0.007 | 21 | 14.8 |
| | 12 | crystal | 874 | 621 | 764 | 675 | 0.008 | 0.008 | 78 | 13.8 |
| | 13 | silicon | 1,811 | 1,933 | 1,745 | 1,919 | 0.002 | 0.001 | 89 | 13.1 |
| | 14 | Amorphous | 110 | 105 | 99 | 85 | 0.026 | 0.029 | 11 | 15.2 |
| | 15 | glass | 106 | 111 | 76 | 73 | 0.034 | 0.038 | 9 | 15.3 |
| | 16 | Crystallized | 120 | 122 | 84 | 67 | 0.07 | 0.068 | 8 | 14.8 |

TABLE 2-continued

| | No. | Substrate material | Outer chamfer average roughness Å | Inner chamfer average roughness Å | Outer end surface average roughness (Ra) Å | Inner end surface average roughness (Ra) Å | Outer R surface curvature (R) mm | Inner R surface curvature (R) mm | Film exfoliation portions numbers/surface | SNR dB |
|---|---|---|---|---|---|---|---|---|---|---|
| | 17 | glass | 105 | 120 | 45 | 49 | 0.061 | 0.049 | 8 | 14.9 |
| | 18 | Single-crystal silicon | 108 | 105 | 55 | 64 | 0.044 | 0.045 | 7 | 15.1 |
| | 19 | | 107 | 120 | 45 | 38 | 0.061 | 0.071 | 7 | 15.2 |
| Longitudinal recording medium | 20 | Amorphous glass | 987 | 1,208 | 1,000 | 745 | 0.024 | 0.022 | 0 | Not Measured |
| | 21 | Crystallized glass | 2,003 | 2,121 | 2,100 | 1,818 | 0.033 | 0.033 | 0 | |
| | 22 | Single-crystal silicon | 1,533 | 1,521 | 1,899 | 1,287 | 0.021 | 0.021 | 0 | |

As is clear from these results, a perpendicular magnetic recording medium employing the magnetic recording medium substrate product of the present invention has no occurrence of film exfoliation caused by corrosion, and exhibits high SNR (i.e., high performance).

In the longitudinal magnetic recording medium, by virtue of the nature of the employed thin films, film exfoliation caused by corrosion did not occur.

INDUSTRIAL APPLICABILITY

When a chamfer is formed so as to attain such a small surface roughness, contact strength between the chamfer and a soft magnetic layer is enhanced, and occurrence of corrosion in the soft magnetic layer can be suppressed. Therefore, the resultant magnetic recording medium exhibits no deterioration of electromagnetic conversion characteristics. As a result, there can be effectively resolved problems that conventionally arise, including reading error due to SNR reduction at the outer periphery of a magnetic recording medium, and erasure failure of adjacent signals due to side writing caused by unstable flying of a magnetic head, which unstable flying occurs when the head flies in the vicinity of a corroded portion generated at the outer periphery and the corroded portion is deposited onto the surface of the head.

The invention claimed is:

1. A magnetic recording medium substrate product comprising a disk-shaped non-magnetic substrate which comprises:
   (1) a circular hole in a center portion thereof;
   (2) a main surface on which a magnetic layer is to be formed;
   (3) an outer end surface;
   (4) an inner end surface defining the circular hole;
   (5) a chamfer formed at least one of a first portion between the main surface and the outer end surface and a second portion between the main surface and the inner end surface; and
   (6) a curved surface (R surface) having a radius of 0.01 mm to 0.05 mm, which is formed at a corner portion between the main surface and the chamfer,
   wherein the chamfer has a surface roughness (Ra) falling within a range of 4.0 Å $\leq$ Ra $\leq$ 100 Å as measured by means of an AFM, and the curved surface has a surface roughness (Ra) falling within a range of 4.0 Å $\leq$ Ra $\leq$ 50 Å as measured by means of an AFM and wherein the non-magnetic substrate is formed of any of amorphous glass, crystallized glass and silicon.

2. A magnetic recording medium substrate product according to claim 1, wherein the magnetic recording medium substrate is a perpendicular magnetic recording medium substrate for producing a perpendicular magnetic recording medium.

3. A magnetic recording medium substrate product according to claim 2, wherein the perpendicular magnetic recording medium comprises a soft magnetic underlayer.

4. A magnetic recording medium substrate product according to claim 3, wherein the soft magnetic underlayer comprises an alloy containing Fe or Co.

5. A magnetic recording medium substrate product according to claim 1, wherein the chamfer has a surface roughness (Ra) falling within a range of 4.0 Å $\leq$ Ra $\leq$ 50 Å as measured by means of an AFM.

6. A magnetic recording medium substrate product according to claim 1, wherein the outer end surface has a surface roughness (Ra) falling within a range of 4.0 Å $\leq$ Ra $\leq$ 100 Å as measured by means of an AFM.

7. A magnetic recording medium substrate product according to claim 6, wherein the outer end surface has a surface roughness (Ra) falling within a range of 4.0 Å $\leq$ Ra $\leq$ 50 Å as measured by means of an AFM.

8. A magnetic recording medium substrate product according to claim 1, wherein the inner end surface has a surface roughness (Ra) falling within a range of 4.0 Å $\leq$ Ra $\leq$ 100 Å as measured by means of an AFM.

9. A magnetic recording medium comprising a magnetic recording medium substrate product according to claim 1, and a perpendicular magnetic recording medium layer on a main surface of the substrate product.

10. A magnetic recording and reproducing apparatus comprising a magnetic recording medium according to claim 9.

11. A magnetic recording medium comprising a magnetic recording medium substrate product according to claim 2, and a perpendicular magnetic recording medium layer on a main surface of the substrate product.

12. A magnetic recording medium comprising a magnetic recording medium substrate product according to claim 3, and a perpendicular magnetic recording medium layer on a main surface of the substrate product.

13. A magnetic recording medium comprising a magnetic recording medium substrate product according to claim 4, and a perpendicular magnetic recording medium layer on a main surface of the substrate product.

14. A magnetic recording medium comprising a magnetic recording medium substrate product according to claim 5, and a perpendicular magnetic recording medium layer on a main surface of the substrate product.

15. A magnetic recording medium comprising a magnetic recording medium substrate product according to claim 6, and a perpendicular magnetic recording medium layer on a main surface of the substrate product.

16. A magnetic recording medium comprising a magnetic recording medium substrate product according to claim 7, and a perpendicular magnetic recording medium layer on a main surface of the substrate product.

17. A magnetic recording medium comprising a magnetic recording medium substrate product according to claim 8, and a perpendicular magnetic recording medium layer on a main surface of the substrate product.

\* \* \* \* \*